US011093480B2

(12) United States Patent
Subhedar

(10) Patent No.: US 11,093,480 B2
(45) Date of Patent: Aug. 17, 2021

(54) AGGREGATION ANALYSIS AND REMEDIATION OF DATA INVALIDATIONS

(71) Applicant: Microsoft Technology Licensing, LLC, Redmond, WA (US)

(72) Inventor: Sameeksha Suresh Subhedar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 245 days.

(21) Appl. No.: 16/293,480

(22) Filed: Mar. 5, 2019

(65) Prior Publication Data

US 2020/0285533 A1    Sep. 10, 2020

(51) Int. Cl.

| | |
|---|---|
| *G06F 16/23* | (2019.01) |
| *G06F 16/215* | (2019.01) |
| *G06F 16/21* | (2019.01) |
| *G06F 16/2457* | (2019.01) |
| *G06F 16/25* | (2019.01) |
| *G06F 11/07* | (2006.01) |
| *G06F 12/0802* | (2016.01) |

(52) U.S. Cl.
CPC ...... *G06F 16/2365* (2019.01); *G06F 11/0781* (2013.01); *G06F 12/0802* (2013.01); *G06F 16/211* (2019.01); *G06F 16/215* (2019.01); *G06F 16/24578* (2019.01); *G06F 16/252* (2019.01); *G06F 11/0757* (2013.01); *G06F 11/0775* (2013.01); *G06F 11/0793* (2013.01); *G06F 2212/45* (2013.01)

(58) Field of Classification Search
None
See application file for complete search history.

(56) References Cited

U.S. PATENT DOCUMENTS

| | | | |
|---|---|---|---|
| 5,594,863 A | 1/1997 | Stiles | |
| 8,239,369 B2 * | 8/2012 | Levin | G06F 16/217 707/713 |
| 8,612,382 B1 | 12/2013 | Patel et al. | |

(Continued)

OTHER PUBLICATIONS

"Notice of Allowance Issued in U.S. Appl. No. 16/029,999", dated Mar. 5, 2020, 7 Pages.

(Continued)

*Primary Examiner* — Kim T Nguyen

(57) ABSTRACT

The present disclosure relates to processing operations that assess the impact of data invalidations and manage remediation of the data invalidations based on results of an assessment of the impact of the data invalidation on operation of an application/service. Identified data invalidations may be aggregated and analyzed. In one non-limiting example, types of data invalidations are aggregated over a temporal count to identify recent data invalidations. Analysis of aggregated types of data invalidations comprises evaluating an intensity of the types of data invalidations identified within the temporal count. Identified data invalidations may be ranked based on intensity analysis identifying impact on presentation of content through an application/service during the temporal count. Remediation of data invalidations may be managed based on the ranking processing. For example, one or more data invalidations may be prioritized for remediation processing to correct an underlying data structure associated with an error.

20 Claims, 3 Drawing Sheets

100

(56) References Cited

U.S. PATENT DOCUMENTS

| | | | |
|---|---|---|---|
| 8,957,848 B2* | 2/2015 | Kobayashi | G06F 3/044 |
| | | | 345/156 |
| 2004/0255335 A1 | 12/2004 | Fickle et al. | |
| 2007/0067569 A1 | 3/2007 | Vittal et al. | |
| 2007/0294319 A1* | 12/2007 | Mankad | G06F 11/1662 |
| 2010/0293147 A1 | 11/2010 | Snow et al. | |
| 2011/0145242 A1 | 6/2011 | Mehrotra et al. | |
| 2011/0225128 A1 | 9/2011 | Jarrett et al. | |
| 2012/0105194 A1* | 5/2012 | Kobayashi | G06F 3/0416 |
| | | | 340/4.3 |
| 2014/0279944 A1* | 9/2014 | Ghandeharizadeh | ............ |
| | | | G06F 16/2365 |
| | | | 707/690 |
| 2015/0178506 A1 | 6/2015 | Elovici et al. | |
| 2016/0203172 A1* | 7/2016 | Attaluri | G06F 12/023 |
| | | | 707/745 |
| 2017/0177867 A1 | 6/2017 | Crofton et al. | |
| 2017/0286207 A1 | 10/2017 | Campbell et al. | |
| 2018/0248895 A1 | 8/2018 | Watson et al. | |
| 2020/0012553 A1 | 1/2020 | Subhedar et al. | |
| 2020/0285533 A1* | 9/2020 | Subhedar | G06F 11/0781 |

OTHER PUBLICATIONS

"Final Office Action Issued in U.S. Appl. No. 16/029,999", dated Jan. 9, 2020, 23 Pages.

"Non Final Office Action Issued in U.S. Appl. No. 16/029,999", dated Sep. 18, 2019, 26 Pages.

"International Search Report and Written Opinion Issued in PCT Application No. PCT/US2019/037844", dated Aug. 23, 2019, 17 Pages.

"International Search Report and Written Opinion Issued in PCT Application No. PCT/US2020/019401", dated Apr. 21, 2020, 12 Pages.

* cited by examiner

AGGREGATION ANALYSIS AND REMEDIATION OF DATA INVALIDATIONS

RELATED APPLICATIONS

The present application is a co-pending application with U.S. patent application Ser. No. 16/029,999, filed on Jul. 9, 2018, which is hereby incorporated by reference in its entirety.

BACKGROUND

Commonly, data is accessed and modified in distributed networking examples where one or more users may update content through an application or service. A piece of data that is stored in a distributed storage (e.g., cloud storage) can be updated by multiple users, from multiple devices, and also can be updated through the various services that act on the data. There is a possibility that the data being updated, gets corrupted during update processing. Among other reasons, this may be due to issues on any of the clients or the services that access the data.

Previously, in cases of content corruption, the cause of the issue was identified in an ad-hoc manner where attempts were made to track the issue to a specific client or service that may have accessed a distributed storage. Any errors that were found were fixed. However, this process makes it difficult to consistently identify the cause of the issue, data in production that may have entered into a corrupted state and impact of existing issues. Additionally, this type of processing is resource intensive from a processing efficiency standpoint, for example, tying up resources on a client-side as well as a server-side and further requiring additional processing operations to retrieve data from data storages. A corruption remediation service may be configured to address corruption issues one by one, making it difficult to tie multiple data corruption issues to an underlying data structure (for file content) that may be invalid. As more and more endpoints are added for system access, it becomes increasingly difficult to ensure that everyone in disparate systems adheres to schemas rules.

Additionally, when data edits occur to content of an electronic document/electronic file, applications/services typically report partial data edits (i.e. the delta) indicating the changes made over a prior existing version of the content that may already be stored. However, partial data edits may be insufficient to determine the validity of an entire data schema, which may be the root cause of a data invalidation. This may require further data retrieval and analysis to resolve data invalidations.

Further issues exist where an application or service is not readily able to identify and correlate issues that are most impacting (and/or most recently plaguing) operation of the application or service. For instance, a specific instance of a data error may be corrected in a specific user scenario, but other similar errors may occur in a similar time period. Applications/services may not typically be trained to aggregate types of data invalidations and correct the source of the error so that the error does not become repeatable, especially within a short period of time. In cases where error correction is occurring in real-time, real-time error correction may create serious performance implications as a large number of data validation rules may need to be run to identify and remediate an error. This may tie up valuable resources associated with operation of an application/service as well as create latency issues during the operation of the application/service.

SUMMARY

In view of the foregoing technical challenges, the present disclosure relates to processing operations that assess the impact of data invalidations and manage remediation of the data invalidations based on results of an assessment of the impact of the data invalidation on operation of an application/service. Data invalidations may occur from updates to content that is presented through an application/service. Identified data invalidations may be aggregated and analyzed. In one non-limiting example, types of data invalidations are aggregated over a temporal count to identify recent data invalidations. Analysis of aggregated types of data invalidations comprises evaluating an intensity of the types of data invalidations identified within the temporal count. Identified data invalidations may be ranked based on intensity analysis identifying impact on presentation of content through an application/service during the temporal count. Remediation of data invalidations may be managed based on the ranking processing. For example, one or more data invalidations may be prioritized for remediation processing to correct an underlying data structure associated with an error.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
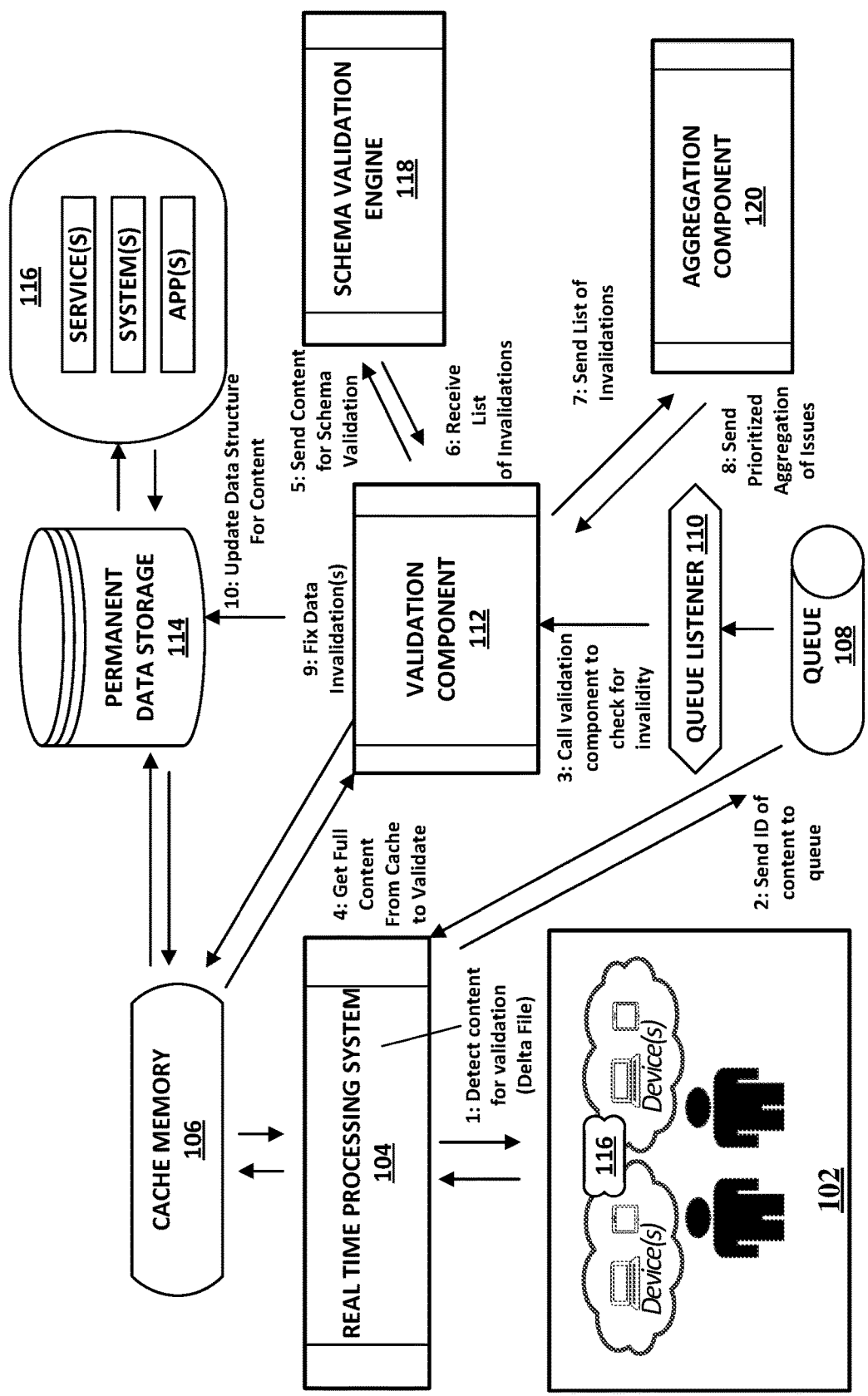
FIG. 1 illustrates an exemplary process flow providing exemplary components for content validation processing, with which aspects of the present disclosure may be practiced.

The present disclosure relates to processing operations that assess the impact of data invalidations and manage remediation of the data invalidations based on results of an assessment of the impact of the data invalidation on operation of an application/service. Data invalidations may occur from updates to content that is presented through an application/service. Identified data invalidations may be aggregated and analyzed. In one non-limiting example, types of data invalidations are aggregated over a temporal count to identify recent data invalidations. Analysis of aggregated types of data invalidations comprises evaluating an intensity of the types of data invalidations identified within the temporal count. Identified data invalidations may be ranked based on intensity analysis identifying impact on presentation of content through an application/service during the temporal count. Remediation of data invalidations may be managed based on the ranking processing. For example, one or more data invalidations may be prioritized for remediation processing to correct an underlying data structure associated with an error.

As identified above, data invalidations may be aggregated and analyzed within a temporal count. This provides numerous technical improvements over traditional ad-hoc data remediation systems. Aggregation of invalidation incidents identifies which invalidations have the maximum impact on operation of an application/service due to sheer count/volume. On top of aggregation analysis, intensity analysis helps qualify the top errors returned by the aggregation analysis according to real customer impact (e.g., immediate data loss, future data loss, no data loss, data hangs, data crashes, loss of content). Also, validation of data, used to identify data invalidations, happens over real-time edits, which correlates to identifying highly used entities through a system/service. This enables components associated with data validation processing to identify patterns for data validations within a specific time period (e.g., minute, hour, day, month, year) and modify its processing to remediate data invalidations for that time period to improve real-time processing for an application/service. In traditional systems that resolve data invalidations, data remediation may occur for each individual identification of a data invalidation, which is inefficient from a processing standpoint and also shows a lack of intelligence for identifying correlations between data invalidations. Processing operations described herein improve over traditional systems by aggregating types of data invalidations and analyzing the aggregated types of data invalidations to identify how specific types of data invalidations impact operation of an application/service. For example, updates to a specific type of electronic file may cause errors in a data structure for an electronic document that affects numerous users within a specific time period. This may cause data loss when users attempt to access updated content of an electronic document at a future point in time, which immediately affects operation of an application/service. In other instances, user updates to an electronic file may cause errors in a data structure that may not instantaneously manifest. However, those errors could be triggered by other conditions or events at a later point in time. In further examples, some data invalidations may not result in data loss at all.

Aggregation and analysis processing improve validation processing through identification and prioritization of remediation of data invalidations based on a potential impact to operation of an application/service. For example, data invalidations may be analyzed based on aggregated count types (e.g., numeric and/or temporal), intensity indicating impact on operation of an application/service, business requirements associated with one or more applications/services, user feedback and/or a combination thereof. Non-limiting examples of parameters for evaluating intensity of a data invalidation comprise but are not limited to: a number of data invalidations in an aggregated type (e.g., count of a specific type of data invalidations); a type of document associated with content that in which the data invalidation is identified; an amount of data loss associated with an individual data invalidation, domain-specific business requirements associated with the application or service; and user feedback signal data collected from usage of the application or service, among other examples. A ranking of intensity of data invalidations (e.g., aggregated types of data invalidations) may be generated and utilized to order data invalidations for data remediation processing. For instance, one or more data invalidations, identified within a temporal count, that have a highest intensity ranking may be prioritized for data remediation processing over other queued data validation processing requests (e.g., checks for invalidities amongst data structures associated with content).

Moreover, the present disclosure relates to processing operations that enable use of cache memory for content validation and error remediation of content. A cache is typically used to optimize performance by providing a temporary stop for data between a user and a permanent data store. In examples described herein, functionality of the cache is extended to enable interfacing between a cache memory, a validation component that is configured to validate data read directly from a cache memory, and an aggregation component that aggregates and analyzes data invalidations for priority processing. If content is found to be corrupted, the content may be updated in the cache memory and propagated to a permanent data store associated with an application/service, system, etc. Use of the cache may be optimal for targeting recent and/or heavily accessed content as well as a means for offloading data processing operations from a permanent data storage (e.g., distributed data storage). Examples described herein extend to those in which data associated with an electronic file is already stored in cache memory as well as those in which update occurs directly to a permanent data storage. Data invalidations may be remediated asynchronously from real-time access to content through an application/service. As a non-limiting example, data invalidations may occur when read-write access to content is not actively requested through an application/service. For example, content may be updated (e.g., through a system, another application or service) which is not being directly edited by a real time processing system for an exemplary application/service. In such an instance, a notification may be provided to add content to a validation queue. The validation queue provides an asynchronous layer that listens to transactional flow and validates queued data.

In one non-limiting example, a data structure for an electronic file is read from a cache memory that is associated with an application or service. Content of the electronic file is validated based on an evaluation of the data structure read from the cache memory. For example, validation processing may comprise application of exemplary validation rules that are usable to evaluate any data associated with the data structure including but not limited to: exemplary data nodes of the data structure; and properties associated with those data nodes. Exemplary validation rules may programmatically evaluate a hierarchy of any type of data structure (e.g., data graph, data tree, hash) including evaluation of data nodes (e.g., parent nodes, child nodes), their corresponding sub-nodes as well as properties corresponding with respective data nodes. As such, in one example, a full data structure of an electronic file may be evaluated as compared with instances where only revisions to an electronic file are evaluated for correctness. This may improve accuracy in detection of content invalidity as well as enable fixes to prevent more widespread content corruption as well as instances of future content corruption.

Continuing the above example, one or more invalidities in the content may be detected based on a result of the validation processing. When an instance of corruption is detected, processing operations may be automatically executed to perform an in-memory fix of the data structure. In further examples, processing by an aggregation component is utilized to further analyze data invalidations to identify trends, patterns, impact of errors, etc., based on recent usage through an application/service. The aggregation component is configured to interface with a validation component, among other system components, to aggregate and analyze data invalidations for optimal remediation processing as well as provision of telemetric feedback regarding identified data invalidations (including temporal contexts).

An exemplary data structure for an electronic file may be updated to correct one or more invalidities in the content of the electronic file. This may include direct fixes to specific portions of an exemplary data structure (and corresponding data/metadata) as well as correction of an entirety of a corrupted data structure. In one instance, update may occur through a validation component, where an updated data structure may be propagated to a permanent data storage that is associated with an exemplary application/service. An aggregation component may analyze data invalidations and provide a validation component with an identified subset of data validations for remediation based on analysis of aggregated data invalidations.

Validation processing described herein enables an updated version of an electronic file to be directly accessed from the cache memory as well as retrieved from the permanent data storage. Update to the permanent data storage is important in instances where file data for an electronic file is cached as well as instances where the permanent data storage is a shared data storage that is accessible by other systems, applications/services, etc. In any example, the exemplary cache is configured to be used as a store for detecting content that has already reached a corrupted state. This technique may be utilized in any system (including distributed systems/services) that have accessed to shared data storage including instances where data is not directly served to a cache memory. In-memory fixes are performed to correct invalidities in content in electronic files. In some instances, detection of invalidity may result in a determination that an entire data structure (for an electronic file) is corrupted. In such cases, an entire data structure (e.g., full data structure) may be re-rendered, for example, to prevent continued instances of corruption as well as mitigate future (potentially unforeseen) issues.

Exemplary technical advantages provided by processing described in the present disclosure including but are not limited to: aggregation of data invalidations for temporal analysis; domain-specific analysis of impact of data invalidations on operation of an application/service including intensity metrics for contextual analysis of a data invalidation; an ability to prioritize types of data invalidations for data remediation processing; extending functionality of a cache memory above the traditional means of use to enable interfacing for content validation; improving processing efficiency for content validation and error remediation upon identification; reducing latency in distributed system/service examples that execute data validation processing and error remediation; extending functionality and usability for shared data storage systems; improved processing efficiency (e.g., reduction in processing cycles, saving resources/bandwidth) during for computing devices during execution of content validation processing, analysis of data invalidations and error remediation; programmatic application of customized validation rules to improve validation processing and data invalidation remediation; an improved graphical user interface (GUI), as compared with traditional GUIs, that is configured to provide graphical displays and telemetric analysis for identified data invalidations (i.e. aggregated data invalidations); an ability to correct invalidities in large amounts of data; an ability to prioritize corrections based on customer impact; and extensibility to work with any type of data structures, among other technical advantages.

FIG. 1 illustrates an exemplary process flow 100 providing exemplary components for content validation, with which aspects of the present disclosure may be practiced. As an example, components of process flow 100 may be executed by an exemplary computing system (or computing systems) as described in the description of FIG. 3. Exemplary components, described in process flow 100, may be hardware and/or software components, which are programmed to execute processing operations described herein. In one example, components of process flow 100 may each be one or more computing devices associated with execution of a specific service. Exemplary services may be managed by an application platform that also provides, to a component, access to and knowledge of other components that are associated with applications/services. In one instance, processing operations described in process flow 100 may be implemented by one or more components connected over a distributed network. Operations performed in process flow 100 may correspond to operations executed by a system and/or service that execute computer programs, application programming interfaces (APIs), neural networks or machine-learning processing, language understanding processing, search and filtering processing, and generation of content for presentation through a user interface of an application/service, among other examples.

In the illustration of process flow 100, there are numbered process flow steps that are provided to illustrate interaction between components shown in FIG. 1. For example, steps 1-10 illustrate one example process flow for execution of data validation processing and error remediation as described herein. It is to be recognized that the numbered process flow steps are aimed at illustrating non-limiting examples of interaction between components of FIG. 1. Process flow between components may be altered without departing from the spirit of the present disclosure.

Process flow 100 comprises user computing device(s) 102 (e.g., client computing device). An example of a user computing device 102 is a computing system (or computing systems) as described in the description of FIG. 3. A user may interact with an exemplary application/service (subsequently described in component(s) 116) through the user computing device(s) 102. For instance, the user may connect to an application/service through any number of different device modalities. In some examples, a user may connect to an application/service (e.g., distributed data storage service; productivity service) through different user computing devices 102, where non-limiting examples of such are: a smart phone, a laptop, a tablet, a desktop computer, etc. In other instances, a user may carry on a multi-modal communication with an application/service via multiple user computing devices. For example, a user may be accessing a first electronic file via a laptop or tablet and further connect to a collaboratively shared electronic file via a mobile computing device such as a cellular phone or smartphone.

As referenced above, exemplary applications/services may interface with other components of process flow 100 to enhance processing efficiency and functionality as described herein. For instance, specific components of process flow 100 may each be associated with one or more application/services to enable functionality of each of the components. Process flow 100 includes hosting components 116 that comprise services, systems and applications. Applications and/or services may be any type of programmed software, An exemplary application/service is a productivity application/service that is configured for execution to enable users to complete tasks on a computing device, where exemplary productivity services may be configured for access to content including electronic files/content retrieved via a network connection (e.g., Internet, Bluetooth®, infrared). Examples of productivity services comprise but are not limited to: word processing applications/services, spreadsheet applications/services, notes/notetaking applications/services, authoring applications/services, digital presentation applications/services, search engine applications/services, email applications/services, messaging applications/services, web browsing applications/services, collaborative team applications/services, digital assistant applications/services, directory applications/services, mapping services, calendaring services, electronic payment services, digital data storage or distributed data storage applications/services, web conferencing applications/services, call communication applications/services, language understanding applications/services, bot framework applications/services, networking applications/service, and social networking applications/services, among other examples. In some examples, an exemplary productivity application/service may be a component of a suite of productivity applications/services that may be configured to interface with other applications/services associated with an application platform. For example, a word processing service may be included in a bundled service (e.g. Microsoft® Office365® or the like). Further, an exemplary productivity service may be configured to interface with other internet sources/services including third-party application/services, for example, to enhance functionality of productivity services during execution of operations such as retrieving file content, accessing file content, updating file content, validating content and storing content, among other examples.

An exemplary electronic file (or digital document) is a representation of content in an electronic media/electronic format such as a digital file. Examples of electronic files may vary where files may be created to work with any type of application/service. Types of electronic files are known to one skilled in the field. For instance, an electronic file may be created for a word processing service or notetaking service, where the electronic file may comprise authored content. Electronic files may be accessed natively, through applications stored on the user computing device. In alternate examples, electronic files may be accessed over a network connection, for example, where an electronic file is a web page accessed through a web browser or a distributed copy of a document that is being accessed but is remotely stored on a data storage other than the user computing device. Consider an instance where a user accesses a notetaking service for free-form information gathering and multi-user collaboration. The user may be utilizing the notetaking service to access and edit a shared electronic file that is collaboratively accessed by a group of users. On the back-end, the notetaking service may itself comprise distributed data storage (or shared data storage) for a user to store electronic files and/or the notetaking service may interface with a data storage application/service to provide data storage for said electronic files.

An exemplary real time processing system 104 is one or more components that are configured for to provide access to content through an application/service for users of the application/service. The real time processing system 104 fosters near-instantaneous output of data between user computing device(s) 102, hosting components 116 (e.g., applications, services, systems) and back-end processing components (e.g., cache memory 106, queue 108, queue listener 110, validation component 112, permanent data storage 114, schema validation engine 118 and the aggregation component 120). The real time processing system 104 may directly interface with user computing device(s) 102, among other components of process flow 100. As an example, the real time processing system 104 is configured so that customers are served data from a cache memory 106. The real time processing system 104 may be correlated to track data from the cache memory 106 that pertains to content that is being accessed or recently accessed (within a predetermined time period as specified by developers and/or data retention policies). Data from the cache memory 106 is populated from a permanent data store 114, which maintains data (e.g., electronic files, log data, version data) used for execution of exemplary hosting components 116. In execution, the real time processing system 104 is configured to take input of rapidly changing data and then provide output near instantaneously so that change over time is efficiently updated to the permanent data storage 114 and readily seen by the user. For instance, the real time processing system 104 may detect user requests for and/or access to electronic files and interface with a user computing device 102 to provide surface a representation of the electronic file through a user interface of an application or service. The cache memory 106 may store data for active access (or recent access) to an electronic file, where updates to that electronic file can be tracked and implemented on behalf of a user. Updates made to electronic files (e.g., via a user computing device 102) may be further propagated to the permanent data storage 114. The real time processing system 104 may interface with other processing components of process flow 100 through APIs or the like. In some examples, the real time processing system 104 may track usage of electronic files within a specific application service. In other examples, the real time processing system 104 may comprise a plurality of components that are configured to track usage of electronic files across a plurality of applications/services that may share access to the permanent data storage 114.

In one example shown in FIG. 1, method steps for content validation processing may be initiated by the real time processing system 104, where the real time processing system 104 detects content for validation. In one example, detection of content for validation (step 1 of FIG. 1) may comprise detection that content of an electronic file has been edited or modified. In one non-limiting example, step 1 detects content for validation as a partial data edit (i.e. delta file), representing an update to an electronic file, that reflects only the changes made to the electronic file above what is stored in a prior existing version of the electronic file. In an alternative example, detection of content for validation may comprise detecting that a user has accessed an electronic file whether or not content of the electronic file is modified. In such instances, data structures for files may be queued for validation processing, when a system has available resources, to identify potential data errors before they arise to the level where operation of an application/service is affected. This may occur in a technical scenario where numerous different systems/services are accessing and/or updating content of an application/service.

The real time processing system 104 may be further configured to interface with an exemplary queue component 108 (hereinafter "queue" or "validation queue"), where the real time processing system 104 may transmit/submit identification (ID) of content (e.g., electronic file) to the queue 108 to further validation processing. Step 2 (of FIG. 1) is the transfer of the ID of the content from the real time processing system 104 to the queue 108 for content validation. An exemplary (ID) of content may be any type of data indicative of a specific electronic file, a delta file associated with update to content, and/or reference to a location of data of the electronic file within the cache memory 106 so that the data structure of the electronic file may be analyzed. An exemplary validation component 112 may be configured to utilize the ID to retrieve data for the electronic file from the cache memory 106 to execute validation processing.

As referenced above, the cache memory 106 (or cache) may interface with the real time processing system 104, among other components. An exemplary cache memory 106 is a hardware or software component that stores data so that future requests for data may be served faster. As an example, the cache memory 106 is a high-speed static random access memory (SRAM) that processing components (e.g., processor or microprocessor) can access more quickly (and more efficiently) than regular random access memory (RAM), which may be utilized for the permanent data storage 114. A cache is typically used to optimize performance by providing a temporary stop for data between a user and a permanent data store. In examples described herein, functionality of the cache memory 106 is extended to enable interfacing between the cache memory 106 and a validation component, which is configured to validate data read directly from a cache memory. In doing so, the cache memory 106 is configured as a data store for running validations on content. Content of an electronic file is validated based on an evaluation of a data structure of the electronic file that is read from the cache memory 106.

The cache memory 106 may further directly interface with the validation component 112. In doing so, the cache memory 106 may provide access to data associated with an electronic file so that the validation component 112 may execute validation processing as described herein. The cache memory 106 may be utilized to store any data (or metadata) associated with electronic files including underlying data structure(s) for an electronic file. Non-limiting examples of data structures comprise but are not limited to: graphs; data trees; and hashes, among other examples. Realtime updates typically are incremental edits to the data structure (e.g., graph structure) per user. As referenced in the foregoing, data updates may not always occur directly though the real time processing system 104. Other examples of validation are subsequently described such as when direct edits are made to the permanent data store 114 through other systems (applications/services) not using the cache memory 106.

As previously referenced, data for an electronic file is not always readily found in the cache memory 106. A cache hit occurs when the requested data can be found in the cache memory 106, while a cache miss occurs when data is not found in the cache memory 106. Cache hits are served by reading data from the cache, which is faster than recomputing a result or reading from a slower data store. Developers may configure settings for storage of data within the cache memory 106 (including retention of data stored in a cache) for any length of time without departing from the spirit of the present disclosure. Parameters for storage of data within the cache memory 106 may comply with data retention policies/regulations as well as any user privacy laws or practices.

The permanent data storage 114 is a hardware data storage device or software component (e.g., virtual data storage) that is configured to store data. Examples of data storage devices and software components are known to one skilled in the field of art. An exemplary permanent data storage 114 acts as a dedicated storage for electronic files or other content that may be associated with a user account (or group user account), systems and/or one or more applications/services. For instance, the permanent data storage 114 may store content associated with a specific application/service. In another instance, the permanent data storage 114 may store content across a plurality of hosting components 116, which may include applications, services and system. In such an example, the permanent data storage 114 is a shared data storage for various hosting component 116. In further examples, the permanent data storage 114 may configured to store data associated with user accounts, where any type of electronic file may be stored across dedicated storage associated with a user account.

As an example, the permanent data storage 114 may be one or more distributed data storages accessible over a network connection. An example of a distributed data storage is a cloud-based data storage. A piece of data that is stored in the cloud can be updated by multiple users, from multiple devices, and also can be updated through the various services that act on the data. There is a possibility that the data that gets updated, gets corrupted in the process of update, either due to issues on any of the clients, or the services that access it. However, once data gets updated in the cloud in such corrupted states, due to any one client or user or service, all the users, devices and services that access the data henceforth get the corrupted content, and in some cases are not able to display the data back to the user. This can be perceived as data loss, or content corruption manifesting in failures to sync the data across devices. Also, once data goes into this state, there is no recovery mechanism to put it back in a corrected state. As such, the cache memory 106 and processing components for validation of content (e.g., validation component 112) are utilized to get corrupted data out of its invalid state and restored for user usage.

The permanent data storage 114 exchanges data with the cache memory 106, for example, in instances where data is actively being accessed (or was recently accessed). Moreover, in one instance, a data structure of an electronic file may be validated before an updated version of the electronic file is persisted on the permanent data storage 114. In some alternative instances, the permanent data storage 114 may store any version of an electronic file, where an update to content of the electronic file (or the underlying data structure) may cause a re-write over a previous version of an electronic file.

The real time processing system 104 may further interface with an exemplary queue 108 for validation processing (or validation queue). The queue 108 is configured to provide a queuing mechanism to systematically feed the validation component 112 with content to be validated. Any type of queuing mechanism may be implemented as known to one skilled in the field of art. Furthermore, the queue 108 may be further customized to manage exemplary validation processing so as to reduce latency during system operation. Exemplary validation processing is designed to improve processing efficiency of system operation and not interfere with a user's ability to access data. As a corollary, content for validation may be detected by the real time processing system 104 and propagated to the queue 108 for validation at a later point in time. Timing for execution of validation processing may correlate to a point in time where an electronic file is no longer being accessed so as not to affect service operation while content is being accessed.

An exemplary queue 108 may be configured with processing rules that enable prioritization (or de-prioritization) of data validation processing for specific content. For instance, processing rules may be set based on parameters including but not limited to: the type of electronic file; the type of modification to the content; the amount of access; the frequency of access; specific users that edited content; and processing workload for validation, among other examples. In some examples, the queue 108 may further apply criteria for evaluating whether a content modification is to be validated. The queue 108 may provide a decision point that is configured to determine whether to validate specific content or bypass the validation processing. Some of these decisions may also happen as part of the real time processing system 104 before content is queued for validation. Examples of criteria for determining whether content is to be validated or not may comprise but is not limited to: the type of electronic file; the type of modification to the content; frequency of validation processing on the content (e.g., prior validation processing on electronic file); the type of application/service associated with the content; identification of discrepancies between versions of an electronic file and whether prioritization exists for remediation actions of data invalidations identified by one or more of the schema validation engine 118 and the aggregation component 120, among other examples. In some examples, discrepancies may be identified after content is validated. In examples where an update meets the criteria for choice of content to be validated, content is queued for validation (with the identity of the content as stored in the cache memory 106). In examples where an ID is associated with detected access to content based on an update of the content, prioritization rules may be set to manage whether processing to remediate identified data invalidations is prioritized over processing to detect invalidities in content associated with queued IDs.

An exemplary queue listener 110 may establish an interface between the queue 108 and the validation component 112. The queue listener 110 is a data object (or data objects) that acts as asynchronous event handler for propagating content for validation to the validation component 112. The queue listener 110 may implement a messaging interface that initiates communications between the queue 108 and the validation component 112 to feed the identification of the content to the validation component 112 when the validation component 112 has bandwidth. In some instances, the queue listener 110 may propagate identifications of content one by one. In other cases, identifications of content for validation may be transmitted in batches. The queue listener 110 may execute method step 3, shown in FIG. 1, where a call is executed to the validation component 112 for execution of validation processing of specific content (e.g., electronic file). Based on method step 3, the validation component 112 may execute validation processing by calling a schema validation engine component 118 to execute validation processing for content (e.g., updated content).

When the validation component 112 receives a message, from the queue listener 110, with the identity of the content to be validated, the validation component 112 uses the identity (ID) to fetch the freshest content for that identity from the cache memory 106. Method step 4, shown in FIG. 1, illustrates the interaction between the cache memory 106 and the validation component 112, where the validation component 112 may either: 1) directly access the data structure (and associated data) for the electronic file in the cache memory 106; or 2) the cache memory 106 may propagate the data structure (and associated data) for the electronic file to the validation component 112 to execute further processing.

As referenced above, the validation component 112 is configured to implement a schema validation engine component 118 (hereinafter "schema validation engine 118") to execute validation processing of the content, where content may be checked for invalidity. The schema validation engine 118 applies validation rules to identify invalidities in a data structure for an electronic file. The validation component 112 interfaces with the schema validation engine 118 to transmit content for schema validation, for example, where data structures may be propagated to (or accessed by) the schema validation engine 118. Step 5 (of FIG. 1) comprises sending content to the schema validation engine 118 to execute validation processing on a data structure of the content.

An exemplary schema validation engine component 118 is configured to execute validation processing to identify data invalidations in a data structure for an electronic file. In executing validation processing, the schema validation engine 118 may be configured to execute any of: computer programs, software agents, application programming interfaces (APIs), neural networks and/or machine-learning processing, among other examples. For instance, an exemplary machine learning model may be generated and trained to evaluate data structures for electronic files by applying validation rules that identify invalidities in a data structure (and specific properties within the data structure) as well as determine and apply applicable in-memory fixes to update a data structure to remove any invalidities. A set of validation rules may comprise rules for identifying invalidities as well as rules for remedying identified invalidities. In another example, the validation component 112 is configured to manage a separate set of rules for executing an in-memory fix of identified data invalidations. Creation, training and update of a machine learning model is known to one skilled in the field of art. In the present examples, a machine learning model may be further customized for validation processing using training data that adapts the machine learning model for detection of invalidities in file content and applying in-memory fixes to update a data structure of an electronic file. The schema validation engine 118 is built with a set of validation checks and they check every part of the data structure for consistency and detect if the data is invalid. As one example, consider a graph as the underlying data structure for the content, with multiple different types of nodes with multiple properties, that are also cross-referenced in other nodes. In that example, a validation rule could be to check that nodes have the right ranges for the property values. Another one could be to check that the graph does not have any missing child nodes, or duplicate nodes. In another example, specific file properties such as file extensions, formatting, access privileges, etc., may be validated. The type of content validation could differ based on the data structure under consideration.

Exemplary validation processing may comprise evaluation of full content of an electronic file, where an entirety of data structure for an electronic file may be evaluated. As such, in some examples, validation processing may periodically check a data structure of an electronic file to proactively identify and prevent potential issues that may arise during execution of an exemplary application/service. In some alternative instances, detection of content for validation may comprise identification of specific content that was edited within an electronic file (e.g., a portion of the electronic file). It is to be understood that validation processing described herein is applicable to instances where an entirety of a data structure is evaluated as well as those in which only a portion of the data structure (e.g., pertaining to specific content within a file) is evaluated.

Once the schema validation engine 118 has detected invalidity in the content, using the validation rules, the schema validation engine 118 generates a list of identified data invalidations for the validation component 112. Step 6 of FIG. 1 comprises processing operations where the schema validation engine 118 sends a list of one or more identified data invalidations to the validation component 112 and the validation component 112 receives the list of data invalidations. In some examples, the validation component 112 is configured to immediately execute an in-memory fix of the content (e.g., data structure of the content) based on application of validation rules for remedying identified invalidations. In other examples, the validation component 112 is configured to execute subsequent processing to analyze identified data invalidations to further improve operation of an application/service.

In examples where subsequent analysis is executed on identified data invalidations, the validation component 112 sends the listing of one or more identified data invalidations to an aggregation component 120 (step 7 of FIG. 1). The aggregation component 120 is configured to execute processing operations to aggregate and analyze identified data invalidations. Specific processing operations executed by an exemplary aggregation component 120 are subsequently described in method 200 (FIG. 2), among other portions of the present disclosure. Processing by the aggregation component 120 is used to assess the impact of data invalidations and manage remediation of the data invalidations based on results of an assessment of the impact of the data invalidation on operation of an application/service.

The aggregation component 120 executes operations to aggregate identified data invalidations to one or more levels. Rules for data aggregation when working with domain-specific content, including rules for categorizing data invalidations into specific types/groupings, may be programmed by developers to automate aggregation processing. Categorization of types of data invalidations may be specific to an application/service or a plurality of applications/services (e.g., a suite of productivity applications/services). For example, types of identified data invalidations may be aggregated according to one or more temporal counts to identify recency of data invalidations. The temporal counts used for aggregation may be set by developers and indicate a specific time period in which developers wish to analyze operation of an application/service. For instance, a temporal count may be set to aggregate data invalidations within a specific minute, hour, day month, year or any other period of time. This may assist with identifying issues that are most relevant to operation of an application/service in that specified period of time. Other levels of aggregation may also be applied (alone or in combination with temporal count analysis) to enhance analysis of identified data invalidations. Such levels of aggregation comprise but are not limited to: types of data invalidations by user categorization/groupings of users; types of data invalidations that are specific to one application/service and/or a plurality of applications/services; and groupings of data invalidations that resulted in data loss or application/service interruption, among other examples.

Once data invalidations have been aggregated, the aggregation component 120 is configured to analyze the aggregated types of data invalidations to determine contextual insights into issues associated with an application/service for a specific period of time. Aggregation and analysis processing improve validation processing through identification and prioritization of remediation of data invalidations based on a potential impact to operation of an application/service. For example, data invalidations may be analyzed based on aggregated count types (e.g., numeric and/or temporal), intensity indicating impact on operation of an application/service, and/or a combination thereof. As referenced in the foregoing description, intensity of associated with a data invalidation refers to the impact of the data invalidation on operation of an application/service. Non-limiting examples of parameters for evaluating intensity of a data invalidation comprise but are not limited to: a number of data invalidations in an aggregated type (e.g., count of a specific type of data invalidations); a type of document associated with content that in which the data invalidation is identified; an amount of data loss associated with an individual data invalidation, domain-specific business requirements associated with the application or service; and user feedback signal data collected from usage of the application or service, among other examples. Developers may pre-set a number of different classifications of intensity (e.g., low, medium, high) to classify aggregated types of data invalidations. Any number of intensity classifications may be generated without departing from the spirit of the present disclosure. Intensity classifications may be used to prioritize data invalidations for remediation by the validation component 112.

The aggregation component 120 is configured to implement machine learning modeling to apply parameters associated with intensity to evaluate specific types of data invalidations. Intensity classifications may be generated based on results of machine learning modeling that is trained to evaluate data invalidations in domain-specific contexts. Machine learning modeling may be adapted, trained and updated to continuously classify data invalidations. Developers may apply weighing to different parameters, based on contextual scenarios in which the data invalidations are detected. Machine learning modeling may be trained to classify aggregated data invalidations according to intensity based on pre-determined weightings set by developers. For example, one type of data invalidation may occur in a type of electronic document that is not frequently accessed by users where that type of data invalidation also results in no significant data loss during operation (e.g., presentation) within a GUI of an application/service. In that specific scenario, the data invalidation may be classified as having a low intensity. In contrast, a type of electronic document that is frequently accessed where a data invalidation results in significant data loss during operation of an application/service may result in a data invalidation being classified as having a high intensity. In another example, a data invalidation may relate to a frequently accessed electronic document but not result in significant data loss. This may result in an intermediate intensity classification (e.g., medium, medium-low). In further examples, specific applications/service may have domain specific requirements for classifying data invalidations where a type of electronic document or a threshold of data loss results in a specific intensity classification for a data invalidation. In additional examples, user feedback, received through an application/service, may be utilized to classify an intensity of a data invalidation. For instance, a user may offer, through a GUI, a classification of an error it came across or user comments/feedback may be contemplated when classifying an intensity of a data invalidation. To further reiterate, intensity classifications may further account for a number (count) of data invalidations in an aggregated type of data invalidation. For instance, a classification of a type of data invalidation that has a plurality of instances of data invalidations for that type may have a higher intensity ranking than a classification type that has a small number of data invalidations in that grouping.

The aggregation component 120 is configured to generate and utilize a ranking of intensity of data invalidations (e.g., aggregated types of data invalidations). For instance, one or more data invalidations, identified within a temporal count, that have a highest intensity ranking may be prioritized for data remediation processing over other queued data validation processing requests (e.g., checks for invalidities amongst data structures associated with content). The ranking may be utilized by the validation component 112 to identify an order in which to execute error remediation of data invalidations. Ranking (or scoring processing) as pertaining to machine learning modeling is known to one skilled in the field of art. In one example, a classifier is trained to rank aggregated types of data invalidations according to intensity based on domain-specific training that contemplates training data and parameters (features) that define intensity. In some examples, intensity ranking may be plotted into a graphical representation and/or other types of telemetric analysis that may be provided to developers to illustrate trends in data validation for specific temporal counts. The aggregation component 120 may be configured to plot intensity of types of data invalidations and present, through a GUI, a graphical representation of intensity of data invalidations. Other types of telemetric analysis, resulting from execution of machine learning modeling, may also be provided to developers such as in a report form presented through a GUI or sent via other types of modalities (e.g., email, message). This may be useful for tuning subsequent validation processing and error remediation.

At step 8 of FIG. 1, the aggregation component 120 sends/transmits, to the validation component 112, a prioritized aggregation of data invalidations for remediation. This may comprise a ranked listing of aggregated data invalidations that the validation component 112 may utilize to order how validation processing operations are applied. A ranked listing may comprise identification of one or more aggregated grouping of data invalidations. The validation component 112 may be configured to prioritize operations to remediate the identified data invalidations according to the rankings provided by the aggregation component. In one example, error remediation operations may be prioritized over other types of validation processing operations (e.g., identification of new invalidities). In another example, the validation component 112 may utilize this ranked listing to re-order processing operations for data validation that will subsequently be executed. For example, data invalidations having a highest ranked intensity may be remediated first and data invalidations having lower ranked intensity may be scheduled to be remediated at a later point in time. In alternative examples, the aggregation component 120 may be configured to notify the validation component 112 of analysis of data invalidations in batches. For instance, identified groupings or subsets of data invalidations may be propagated to the validation component 112 according to an analyzed level of intensity associated with an aggregated type of data invalidation (e.g., highest intensity data validations sent in a batch and lower intensity data invalidations in another batch). This may assist the validation component 112 in efficiently executing validation processing without being overwhelmed. In some alternative examples (not shown in process flow 100), the aggregation component 120 may interface directly with the queue 108 to prioritize/re-order validation processing transactions for execution by the validation component 112. This may enable the validation component 112 to focus directly on validation processing and error remediation.

During error remediation, the validation component 112 attempts an in-memory fix of the content based on the programmed validation rules (step 9 of process flow 100). Along with this type of invalid content detection, the validation rules may also have information on how to modify the data structure so as to correct the content within it, in order to get the content into a consistent state. One example of a fix to the "missing child node issue" could be search the graph to find if the data that was expected in the missing child is present elsewhere, and then reconstruct a child with that data and replace the missing child. Another fix for an "incorrect property value issue" could be to change the value of the property so that it aligns with the valid property values for that node while maintaining consistency. In another example, validation rules may be set to evaluate file extensions associated with specific content portions. In an instance where a file extension is identified as issue with corrupted content, an in-memory fix of the data structure for the electronic file may comprise processing operations that update the file extension, for example, to a recognized file extension for processing (e.g., display) of content.

When a version of the data structure is updated, the validation component 112 is programmed to write the updated content to the permanent data storage 114 of the real-time system. Method step 10 of FIG. 1 illustrates the interaction between the validation component 112 and/or the cache memory 106 with the permanent data storage 114, where a data structure for content (containing the data invalidation) is updated. In one example, the validation component 112 writes the updated data structure in the cache memory 106 and directs the cache memory 106 to forward the updated data structure to the permanent data storage 114. In another example, the validation component 112 directly requests update of the electronic file with the permanent data storage 114. In that case, the validation component 112 propagates the updated data structure, for an electronic file, to the permanent data storage 114. For instance, the validation component 112 may obtain the updated data structure from the cache memory 106 and forward it to the permanent data storage 114.

As identified in the foregoing, process flow 100 may further comprise hosting components 116. Hosting components 116 may comprise applications, services and/or systems, etc., that may store data/content on the permanent data storage 114 for execution thereof. For instance, the permanent data storage 114 may service a plurality of applications/services, where an application/service may be configured to work with the cache memory 106 while other applications/service may make edits to content without using the cache memory 106. Examples of applications and services have been provided in the foregoing description. Exemplary systems may comprise hardware components, software components or a combination thereof configured for processing of any type of data including content.

Figure 2:
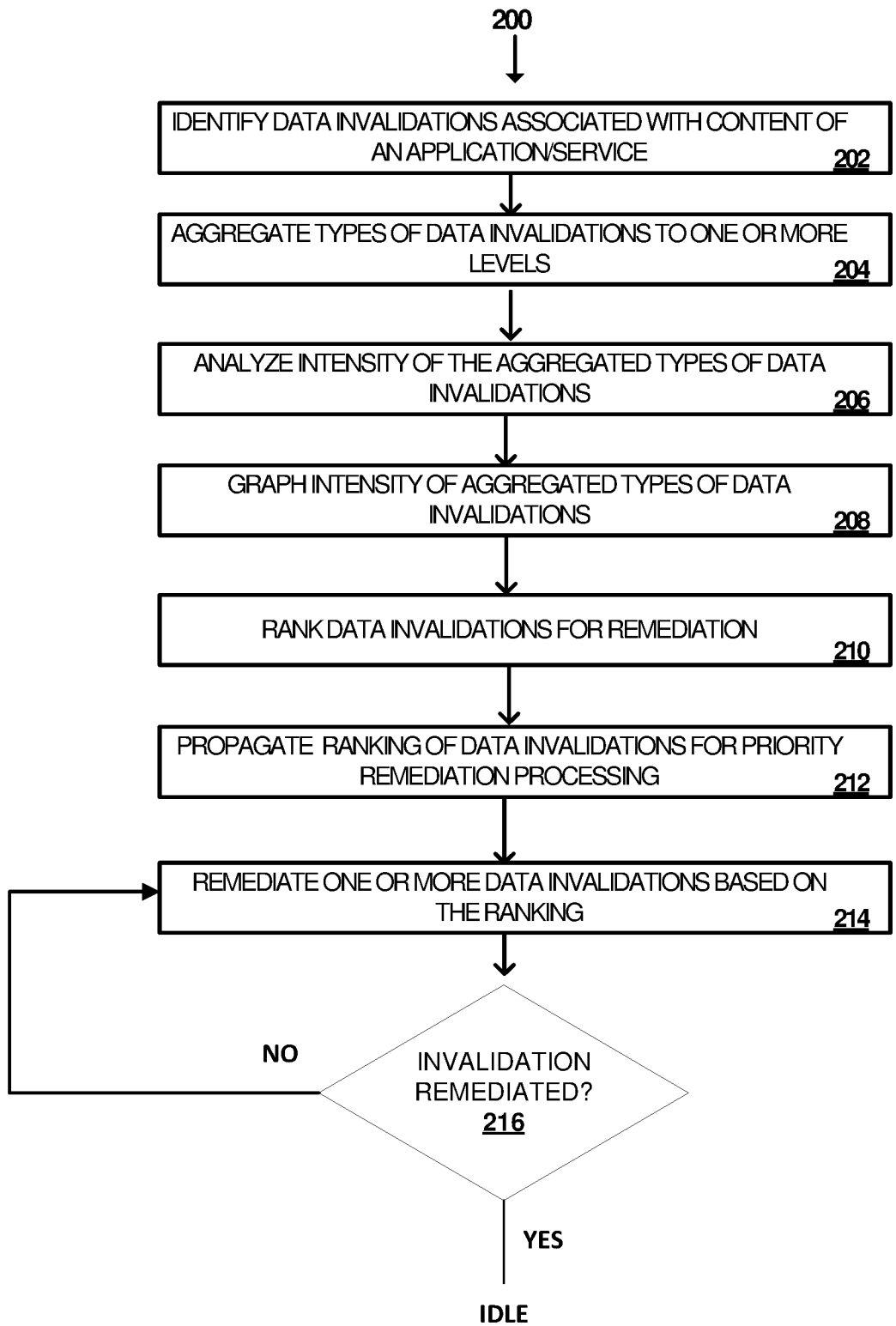
FIG. 2 illustrates an exemplary method related to data invalidation aggregation, analysis and remediation, with which aspects of the present disclosure may be practiced.

FIG. 2 illustrates an exemplary method 200 related to data invalidation aggregation, analysis and remediation, with which aspects of the present disclosure may be practiced. Processing operations described in method 200 may be executed by components described in process flow 100 (FIG. 1), where the detailed description in process flow 100 supports and supplements the recited processing operations in method 200. Interfacing and communication between exemplary components, such as those described in process flow 100, are known to one skilled in the field of art. For example, data requests and responses may be transmitted between applications/services to enable specific applications/services to process data retrieved from other applications/services. Formatting for such communication may vary according to programmed protocols implemented by developers without departing from the spirit of this disclosure.

Figure 3:
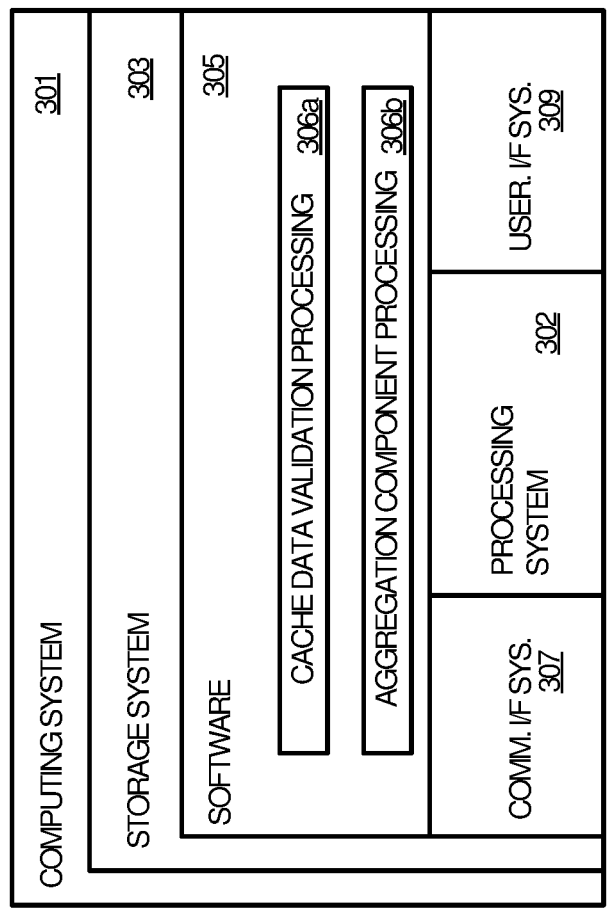
FIG. 3 illustrates a computing system suitable for implementing content validation processing as described herein, with which aspects of the present disclosure may be practiced.

As an example, method 200 may be executed across an exemplary computing system (or computing systems) as described in the description of FIG. 3. Exemplary components, described in method 200, may be hardware and/or software components, which are programmed to execute processing operations described herein. Operations performed in method 200 may correspond to operations executed by a system and/or service that execute computer programs, software agents, intelligent bots, application programming interfaces (APIs), neural networks and/or machine-learning processing, among other examples. In some examples, processing operations described in method 200 may be executed by one or more applications/services associated with a web service that has access to a plurality of application/services, devices, knowledge resources, etc. In one instance, processing operations described in method 200 may be implemented by one or more components connected over a distributed network.

Method 200 begins at processing operation 202, where a plurality of data invalidations is identified for subsequent error remediation analysis. Identification of data invalidations has been described in the foregoing description including the description of process flow 100 (FIG. 1). In one example, data invalidations are identified based on application of validation rules that detect invalidities in data structures of content accessed through an application/service (e.g., content that has been updated). However, data validation processing may be executed on any type of electronic file associated with an application/service without requiring a user to update the content (or add new electronic files) before validation processing is performed.

Flow of method 200 may proceed to processing operation 204, where the identified data invalidations are aggregated to one or more levels. Aggregation processing of data invalidations has been described in the foregoing description including the description of process flow 100 (FIG. 1). An aggregation component may be configured to execute aggregation processing. For example, identified data invalidations are aggregated based on type within a specific temporal count. In one instance, types of data invalidations are aggregated on a daily basis (i.e. one day increments) for subsequent analysis.

At processing operation 206, the aggregated types of data invalidations within a specific temporal count are analyzed to determine an intensity for the aggregated types of data invalidations. Intensity analysis processing has been described in the foregoing description including the description of process flow 100 (FIG. 1). An aggregation component may be configured to execute analysis of intensity of aggregated types of data invalidations. As referenced in the foregoing description, intensity may correlate the impact of the data invalidation on presentation of content through an application/service. Non-limiting examples of parameters for evaluating intensity of a data invalidation comprise but are not limited to: a number of data invalidations in an aggregated type (e.g., count of a specific type of data invalidations); a type of document associated with content that in which the data invalidation is identified; an amount of data loss associated with an individual data invalidation, domain-specific business requirements associated with the application or service; and user feedback signal data collected from usage of the application or service, among other examples.

Intensity analysis of aggregated types of data invalidations may lead to generation of telemetry analytics that can identify trends and patterns in data invalidations for a specific period of time. In processing operation 208, intensity of the aggregated types of data invalidations may be graphed. Graphing (processing operation 208) of the various intensities may comprise plotting, for the temporal count, intensity of the aggregated types of identified data invalidations based on the analyzing; and outputting a graphical representation of the plotted intensity of the aggregated types of identified data invalidations during the temporal count. As referenced in the foregoing description, exemplary graphing of intensities of aggregated data invalidations may be presented to a developer through a GUI or other modality.

Flow of method 200 may proceed to processing operation 210, where the aggregated types of identified data invalidations during the count (e.g., temporal count) are ranked based on results of the analyzing of the intensity of the aggregated types of identified data invalidations. Ranking processing has been described in the foregoing description including the description of process flow 100 (FIG. 1).

The ranking of the identified data invalidations may be propagated (processing operation 212) to a data validation component that executes the remediating of the one or more data invalidations. As identified in the foregoing description, including the description of process flow 100, a data validation component may prioritize remediation processing of one or more data invalidations over other queued data validation processing requests based on the ranking processing. Examples of processing operations for prioritizing error remediation transactions and/or re-ordering data validation transactions for processing based on the ranking have been described in the foregoing description.

At processing operation 214, one or more data invalidations are remediated based on the ranking. Remediation of data invalidations has been described in the foregoing description including the description of process flow 100 (FIG. 1). In some examples, remediation of data invalidations occurs asynchronously from real-time access to the content through an application/service. For instance, a data validation component may be configured to detect that content is no longer being accessed by a user or offline from access by an application/service. This may be a trigger to execute remediation processing on a data invalidation. In another example, processing operation occurs after detecting that read-write access to the content is not requested through the application or service. That is, data remediation occurs asynchronously from real-time access to the content through the application or service based on detecting that the read-write access to the content is not actively being requested.

Error remediation (processing operation 214) may include processing operations that comprise but are not limited to: reading, for content associated with a data invalidation a full data structure for an electronic file from a cache memory associated with the application or service; updating the full data structure to correct the one or more data invalidations, and propagating the updated full data structure to a permanent data storage for subsequent access to the electronic file through the application or service. When an electronic file is subsequently called to be accessed at a later point in time, the updated data structure is read into a cache memory associated with an application/service.

Flow of method 200 may proceed to decision operation 216. At decision operation 216, it is determined if a data invalidation was successfully remediated. In instances where data remediation was not successful, flow of decision operation 216 branches NO and processing of method 200 returns to processing operation 214. At processing operation 214, a data fix may be retried to resolve the data invalidation. In instances where a data invalidation is successfully remediated, flow of decision operation 216 branches YES and processing of method 200 remains idle until new data invalidations are to be addressed.

FIG. 3 illustrates a computing system 301 that is suitable for implementing content validation processing described herein, with which aspects of the present disclosure may be practiced. Computing system 301, which is representative of any system or collection of systems in which the various applications, services, scenarios, and processes disclosed herein may be implemented. Examples of computing system 301 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof. Computing system 301 may be utilized to implement process flow 100 (FIG. 1) implementing exemplary components as described in the foregoing description. Computing system 301 may further be utilized to execute exemplary method 200 (FIG. 2), where processing operations may be specifically executed that are related to data invalidation aggregation, analysis and remediation as described in the foregoing description.

Computing system 301 may be implemented as a single apparatus, system, or device or may be implemented in a distributed manner as multiple apparatuses, systems, or devices. For example, computing system 301 may comprise one or more computing devices that execute processing for applications and/or services over a distributed network to enable execution of processing operations described herein over one or more services. Computing system 301 may comprise a collection of devices executing processing for front-end applications/services, back-end applications/service or a combination thereof. Computing system 301 comprises, but is not limited to, processing system 302, storage system 303, software 305, communication interface system 307, and user interface system 309. Processing system 302 is operatively coupled with storage system 303, communication interface system 307, and user interface system 309. Processing system 302 loads and executes software 305 from storage system 303. Software 305 includes one or more software components that are configured for cache data validation processing 306a, aggregation component processing 306b and/or other applications/services of an application platform as described in the foregoing description. Exemplary cache data validation processing comprises operations to access, read, validate and update data in a cache memory and/or interfacing with a permanent data storage. The aggregation component processing executes processing operations described herein related to data invalidation aggregation, data invalidation analysis (including intensity graphing) and data remediation of invalidations. When executed by processing system 302, software 305 directs processing system 302 to operate as described herein for at least the various processes, operational scenarios, and sequences discussed in the foregoing implementations. Computing system 301 may optionally include additional devices, features, or functionality not discussed for purposes of brevity.

Referring still to FIG. 3, processing system 302 may comprise processor, a microprocessor and other circuitry that retrieves and executes software 305 from storage system 303. Processing system 302 may be implemented within a single processing device but may also be distributed across multiple processing devices or sub-systems that cooperate in executing program instructions. Examples of processing system 302 include general purpose central processing units, graphical processing units, application specific processors, and logic devices, as well as any other type of processing device, combinations, or variations thereof.

Storage system 303 may comprise any computer readable storage media readable by processing system 302 and capable of storing software 305. Storage system 303 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 303 may also include computer readable communication media over which at least some of software 305 may be communicated internally or externally. Storage system 303 may be implemented as a single storage device but may also be implemented across multiple storage devices or sub-systems co-located or distributed relative to each other. Storage system 303 may comprise additional elements, such as a controller, capable of communicating with processing system 302 or possibly other systems.

Software 305 may be implemented in program instructions and among other functions may, when executed by processing system 302, direct processing system 302 to operate as described with respect to the various operational scenarios, sequences, and processes illustrated herein. For example, software 305 may include program instructions for implementing an exemplary cache data validation processing 306a, the aggregation component processing 306b and/ or other applications/services of an application platform, as described in the foregoing description.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 305 may include additional processes, programs, or components, such as operating system software, virtual machine software, or other application software. Software 305 may also comprise firmware or some other form of machine-readable processing instructions executable by processing system 302.

In general, software 305 may, when loaded into processing system 302 and executed, transform a suitable apparatus, system, or device (of which computing system 301 is representative) overall from a general-purpose computing system into a special-purpose computing system customized to process data and respond to queries. Indeed, encoding software 305 on storage system 303 may transform the physical structure of storage system 303. The specific transformation of the physical structure may depend on various factors in different implementations of this description. Examples of such factors may include, but are not limited to, the technology used to implement the storage media of storage system 303 and whether the computer-storage media are characterized as primary or secondary storage, as well as other factors.

For example, if the computer readable storage media are implemented as semiconductor-based memory, software 305 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 307 may include communication connections and devices that allow for communication with other computing systems (not shown) over communication networks (not shown). Communication interface system 307 may also be utilized to cover interfacing between processing components described herein. Examples of connections and devices that together allow for inter-system communication may include network interface cards or devices, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 309 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 309. In some cases, the input and output devices may be combined in a single device, such as a display capable of displaying images and receiving touch gestures. The aforementioned user input and output devices are well known in the art and need not be discussed at length here.

User interface system 309 may also include associated user interface software executable by processing system 302 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein (including productivity applications/services). In some examples, user interface system 309 may be configured to output and display results of data invalidation aggregation and analysis. For instance, a graphing illustrating intensity of aggregated data invalidations within a temporal count may be output for display through a graphical user interface for developers, programmers, etc. to visually identify groupings and intensities of data invalidations within specific time period.

Communication between computing system 301 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
   identifying a plurality of data invalidations associated with content of an application or service;
   aggregating types of the identified data invalidations during a temporal count designating a specific time period of operation of the application or service;
   analyzing, for each of the aggregated types of identified data invalidations, an intensity that corresponds with an impact on presentation of the content through the application or service, wherein the intensity is a classification generated based on an evaluation of parameters comprising
      a number of data validations during the temporal count in an aggregated type of identified data invalidation, and
      a determination as to an amount of data loss associated with the content for the aggregated type of identified data invalidation;
   ranking the aggregated types of identified data invalidations during the temporal count based on results of the analyzing of the intensity of the aggregated types of identified data invalidations; and
   remediating one or more data invalidations based on the ranking.

2. The method of claim 1, wherein the classification, associated with the intensity, is further generated based on evaluation of parameters comprising: a type of document associated with the content, domain-specific business requirements associated with the application or service, and user feedback signal data collected from usage of the application or service.

3. The method of claim 1, wherein the ranking further comprises: graphing, for each of the aggregated types of identified data invalidations during the temporal count, the intensity based on a result of the analyzing; and outputting a graphical representation of the graphing that collectively illustrates intensities of the aggregated types of identified data invalidations.

4. The method of claim 1, wherein the remediating further comprises: accessing, from a cache memory associated with the application or service, a full data structure for an electronic file that comprises the data invalidation; updating, in the cache memory the full data structure to correct the one or more data invalidations, propagating an updated full data structure to a permanent data storage, associated with the application or service, for subsequent access to the electronic file through the application or service.

5. The method of claim 1, wherein an analysis of intensity of each of the aggregated types of identified data invalidations and a ranking analysis, performed in the ranking of the aggregated types of identified data invalidations, occur via application of a trained machine learning model that is adapted to generate a classification of intensity of each of the aggregated types of identified data invalidations and assign a priority ranking to each of the aggregated types of identified data invalidations.

6. The method of claim 5, further comprising: modifying, in a data validation queue, an order of execution of data remediation jobs based on the priority ranking associated with each of the aggregated types of identified data invalidations, and wherein the remediating of the one or more data invalidations occurs as a result of the modifying of the order of execution of data remediation jobs.

7. The method of claim 1, wherein the determination as to the amount of data loss associated with the content is a threshold analysis of data loss relative to a predetermined threshold set for data loss associated with the application or service.

8. A system comprising:
   at least one processor; and
   a memory, operatively connected with the at least one processor, storing computer-executable instructions that, when executed by the at least one processor, causes the at least one processor to execute a method that comprises:
   identifying a plurality of data invalidations associated with content of an application or service;
   aggregating types of the identified data invalidations during a temporal count designating a specific time period of operation of the application or service;
   analyzing, for each of the aggregated types of identified data invalidations, an intensity that corresponds with an impact on presentation of the content through the application or service, wherein the intensity is a classification generated based on an evaluation of parameters comprising
      a number of data validations during the temporal count in an aggregated type of identified data invalidation, and
      a determination as to an amount of data loss associated with the content for the aggregated type of identified data invalidation;
   ranking the aggregated types of identified data invalidations during the temporal count based on results of the analyzing of the intensity of the aggregated types of identified data invalidations; and
   remediating one or more data invalidations based on the ranking.

9. The system of claim 8, wherein the classification, associated with the intensity, is further generated based on evaluation of parameters comprising: a type of document associated with the content, domain-specific business requirements associated with the application or service, and user feedback signal data collected from usage of the application or service.

10. The system of claim 8, wherein the ranking further comprises:
    graphing, for each of the aggregated types of identified data invalidations during the temporal count, the intensity based on a result of the analyzing; and outputting a graphical representation of the graphing that collectively illustrates intensities of the aggregated types of identified data invalidations.

11. The system of claim 8, wherein the remediating further comprises: accessing, from a cache memory associated with the application or service, a full data structure for an electronic file that comprises the data invalidation; updating, in the cache memory the full data structure to correct the one or more data invalidations, propagating an updated full data structure to a permanent data storage, associated with the application or service, for subsequent access to the electronic file through the application or service.

12. The system of claim 8, wherein an analysis of intensity of each of the aggregated types of identified data invalidations and a ranking analysis, performed in the ranking of the aggregated types of identified data invalidations, occur via application of a trained machine learning model that is adapted to generate a classification of intensity of each of the aggregated types of identified data invalidations and assign a priority ranking to each of the aggregated types of identified data invalidations.

13. The system of claim 12, wherein the method, executed by the at least one processor, further comprises: modifying, in a data validation queue, an order of execution of data remediation jobs based on the priority ranking associated with each of the aggregated types of identified data invalidations, and wherein the remediating of the one or more data invalidations occurs as a result of the modifying of the order of execution of data remediation jobs.

14. The system of claim 8, wherein the determination as to the amount of data loss associated with the content is a threshold analysis of data loss relative to a predetermined threshold set for data loss associated with the application or service.

15. A computer-readable storage media storing computer-executable instructions that, when executed by at least one processor, causes the at least one processor to execute a method comprising:
   identifying a plurality of data invalidations associated with content of an application or service;
   aggregating types of the identified data invalidations during a temporal count designating a specific time period of operation of the application or service;
   analyzing, for each of the aggregated types of identified data invalidations, an intensity that corresponds with an impact on presentation of the content through the application or service, wherein the intensity is a classification generated based on an evaluation of parameters comprising
      a number of data validations during the temporal count in an aggregated type of identified data invalidation, and
      a determination as to an amount of data loss associated with the content for the aggregated type of identified data invalidation;
   ranking the aggregated types of identified data invalidations during the temporal count based on results of the analyzing of the intensity of the aggregated types of identified data invalidations; and
   remediating one or more data invalidations based on the ranking.

16. The computer-readable storage media of claim 15, wherein the classification, associated with the intensity, is further generated based on evaluation of parameters comprising: a type of document associated with the content, domain-specific business requirements associated with the application or service, and user feedback signal data collected from usage of the application or service.

17. The computer-readable storage media of claim 15, wherein the remediating further comprises: accessing, from a cache memory associated with the application or service, a full data structure for an electronic file that comprises the data invalidation; updating, in the cache memory the full data structure to correct the one or more data invalidations, propagating an updated full data structure to a permanent data storage associated with the application or service, for subsequent access to the electronic file through the application or service.

18. The computer-readable storage media of claim 15, wherein an analysis of intensity of each of the aggregated types of identified data invalidations and a ranking analysis, performed in the ranking of the aggregated types of identified data invalidations, occur via application of a trained machine learning model that is adapted to generate a classification of intensity of each of the aggregated types of identified data invalidations and assign a priority ranking to each of the aggregated types of identified data invalidations.

19. The computer-readable storage media of claim 18, wherein the method, executed by the at least one processor, further comprising: modifying, in a data validation queue, an order of execution of data remediation jobs based on the priority ranking associated with each of the aggregated types of identified data invalidations, and wherein the remediating of the one or more data invalidations occurs as a result of the modifying of the order of execution of data remediation jobs.

20. The computer-readable storage media of claim 15, wherein the determination as to the amount of data loss associated with the content is a threshold analysis of data loss relative to a predetermined threshold set for data loss associated with the application or service.

\* \* \* \* \*